US012718242B2

(12) United States Patent
Williams et al.

(10) Patent No.: US 12,718,242 B2
(45) Date of Patent: Aug. 25, 2026

(54) TOKENIZED DEVICE IDENTIFIER GENERATOR AND TRACKING SYSTEM

(71) Applicant: MASTERCARD INTERNATIONAL INCORPORATED, Purchase, NY (US)

(72) Inventors: Kyle Williams, Wentzville, MO (US); David J. Senci, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 156 days.

(21) Appl. No.: 18/355,972

(22) Filed: Jul. 20, 2023

(65) Prior Publication Data

US 2025/0029101 A1 Jan. 23, 2025

(51) Int. Cl.
*G06Q 30/00* (2023.01)
*G06Q 20/40* (2012.01)

(52) U.S. Cl.
CPC ................................ *G06Q 20/4014* (2013.01)

(58) Field of Classification Search
CPC .................................................. G06Q 20/4014
USPC ...... 705/44, 1.1, 40, 67, 64, 26.1, 39; 726/4, 726/7, 19; 235/380
See application file for complete search history.

(56) References Cited

U.S. PATENT DOCUMENTS 7,908,645 B2 3/2011 Varghese et al.
8,739,278 B2 5/2014 Varghese
9,112,850 B1 8/2015 Eisen
9,367,844 B1 6/2016 Hu
10,205,721 B2 2/2019 Paschini et al.
10,575,179 B2 * 2/2020 Unnerstall .............. G06F 21/44
2007/0084913 A1 4/2007 Weston
2009/0089869 A1 4/2009 Varghese
2012/0158586 A1 6/2012 Ganti et al.
2014/0101050 A1 4/2014 Clarke et al.
2015/0348042 A1 12/2015 Jivraj et al.
2015/0363581 A1 12/2015 Ranadive et al.
(Continued)

OTHER PUBLICATIONS

ProQuestDialogNPL Search History.*
(Continued)

*Primary Examiner* — John H. Holly
(74) *Attorney, Agent, or Firm* — Armstrong Teasdale LLP

(57) ABSTRACT

An access mapping computing device is configured to build an identification database storing data records, each data record including (i) a verified device identifier identifying a corresponding client computing device, the verified device identifier including tokenized device data of the corresponding client computing device, and (ii) an access profile associated with the verified device identifier and with at least one previous access instance of the corresponding client computing device. The access mapping computing device is further configured to: receive, during a current access instance, device data associated with a candidate client computing device accessing or attempting access to computing resources of a computing network, tokenize the device data to generate a candidate device identifier for the candidate client computing device, query the identification database with the candidate device identifier, and, in response to a successful query, return the verified device identifier retrieved from the identification database.

17 Claims, 9 Drawing Sheets

(56) References Cited

U.S. PATENT DOCUMENTS

2016/0019546 A1 1/2016 Eisen
2016/0021084 A1 1/2016 Eisen
2016/0078436 A1 3/2016 Tomasofsky et al.
2016/0078443 A1 3/2016 Tomasofsky et al.
2016/0078444 A1 3/2016 Tomasofsky et al.
2018/0026962 A1 1/2018 Kaladgi et al.
2018/0082301 A1 3/2018 Chan-Bauza et al.
2019/0019179 A1 1/2019 Mtaza et al.
2019/0251561 A1* 8/2019 Oosthuizen ........ G06Q 20/3821
2020/0162923 A1 5/2020 Unnerstall et al.
2022/0124498 A1* 4/2022 Dymek ............... H04L 63/0876

OTHER PUBLICATIONS ip.com NPL Search History.*
PCT International Search Report and Written Opinion, Application No. PCT/US2024/034293, dated Oct. 7, 2024, 10 pages.

* cited by examiner

TOKENIZED DEVICE IDENTIFIER GENERATOR AND TRACKING SYSTEM

FIELD OF USE

This disclosure relates generally to a tokenized device identifier generator and tracking system, and more particularly, to systems and methods for generating a tokenized device identifier that identifies a client computing device based on certain metadata associated with the client computing device, and tracking the historical use of the client computing device to verify or decline a current use of the client computing device.

BACKGROUND

Consumers are oftentimes able to use a variety of methods to perform payment transactions to purchase goods and services. These methods include use of cash, plastic payment cards, digital wallets, smartphones, and other computing devices operated by users (also known as client computing devices) that are able to provide account data and transaction data to complete a purchase. In the case of account data being communicated for the payment transactions, a payment processor computing device typically processes the payment transactions over a processing network. The payment cards and/or client computing devices may be used at point of sale (POS) devices operated by merchants (in what are referred to herein as merchant location transactions), or users may initiate transactions when not at a merchant physical location (e.g., an online transaction initiated from home, such as to order goods from a merchant website). These latter transactions are sometimes also referred to as card-not-present transactions (CNP), because a payment card is not physically presented at a merchant location when the payment transaction is performed.

Where goods are purchased from a merchant website (e.g., as part of a CNP transaction), in some cases, it has been observed that users may attempt to fraudulently obtain such goods using lost or stolen payment cards or lost or stolen account information. In many cases, these fraudulent users may access merchant websites using a computer device and input the lost or stolen account information in the website accessed by the computer device. These fraudulent acts may be repeated many times by the same fraudulent users. These users may, in addition, attempt to resell the fraudulently obtained goods, such as, for example, by way of a third-party merchant reseller website, where the goods may be advertised for resale. In addition, to encourage resale, such users may advertise the goods at a reduced price, and once the goods have sold, these users may profit monetarily by the sale.

In some cases, therefore, attempts to identify computing devices associated with fraudulent behavior have been made. However, even small changes in device access, such as a new IP address, varying account identifiers, varying locations, and the like, can often be sufficient to avert detection. An improved system and method is needed to address these and other related problems associated with identifying and tracking computing devices linked to fraudulent behavior.

BRIEF DESCRIPTION

In one aspect, an access mapping computing device for identifying a client computing device and determining whether to provide access to computing resources of a computing network is provided. The access mapping computing device includes at least one processor in communication with at least one memory device. The at least one processor is programmed to build an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network. The at least one processor is also programmed to receive, during a current access instance, device data associated with a candidate client computing device accessing or attempting access to the computing resources of the computing network, and tokenize the device data to generate a candidate device identifier for the candidate client computing device. The at least one processor is further programmed to query the identification database with the candidate device identifier, and, in response to a successful query of the identification database, return the verified device identifier retrieved from the identification database that corresponds to the candidate device identifier.

In another aspect, a computer-implemented method for identifying a client computing device and determining whether to provide access to computing resources of a computing network is provided. The method is implemented by an access mapping computing device including at least one processor in communication with at least one memory device. The method includes building an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network. The method also includes receiving, during a current access instance, device data associated with a candidate client computing device accessing or attempting access to the computing resources of the computing network, and tokenizing the device data to generate a candidate device identifier for the candidate client computing device. The method further includes querying the identification database with the candidate device identifier, and, in response to a successful query of the identification database, returning the verified device identifier retrieved from the identification database that corresponds to the candidate device identifier.

In a further aspect, at least one non-transitory computer-readable storage medium having computer-executable instructions stored thereon is provided. When executed by at least one processor of an access mapping computing device, the computer-executable instructions cause the at least one processor to build an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network. The computer-executable instructions also cause the at least one processor to receive, during a current access instance, device data associated with a candidate client computing device accessing or attempting access to the computing resources of the computing network, and tokenize the device data to generate a candidate device identifier for the candidate client computing device. The computer-executable instructions further cause the at least one processor to query the identification database with the candidate device identifier, and, in response to a successful query of the identification database, return the verified device identifier retrieved from the identification database that corresponds to the candidate device identifier.

BRIEF DESCRIPTION OF THE DRAWINGS

FIG. 1 is a schematic diagram illustrating components of a device identification and tracking platform for identifying client computing devices used to access network resources and tracking device behavior across access instances.

FIG. 2 is a block diagram of the device identification and tracking platform shown in FIG. 1 including multiple example computing devices communicatively coupled to each other via a plurality of network connections.

FIG. 3 illustrates a flow diagram of an example device identification process carried out by the device identification and tracking platform of FIGS. 1 and 2.

FIGS. 4 and 5 illustrate sample relevance scores output by the device identification and tracking platform during the device identification process.

FIG. 6 illustrates a flow diagram of an example access control process carried out by the device identification and tracking platform of FIGS. 1 and 2.

FIG. 7 illustrates an example configuration of a user system, such as a client computing device configured to access network resources.

FIG. 8 shows an example configuration of a server system, such as the access mapping computing device shown in FIGS. 1 and 2.

FIG. 9 shows an example method flow for a method of identifying and tracking device access to network resources.

Like numbers in the figures indicate the same or functionally similar components.

DETAILED DESCRIPTION

Figure 1:
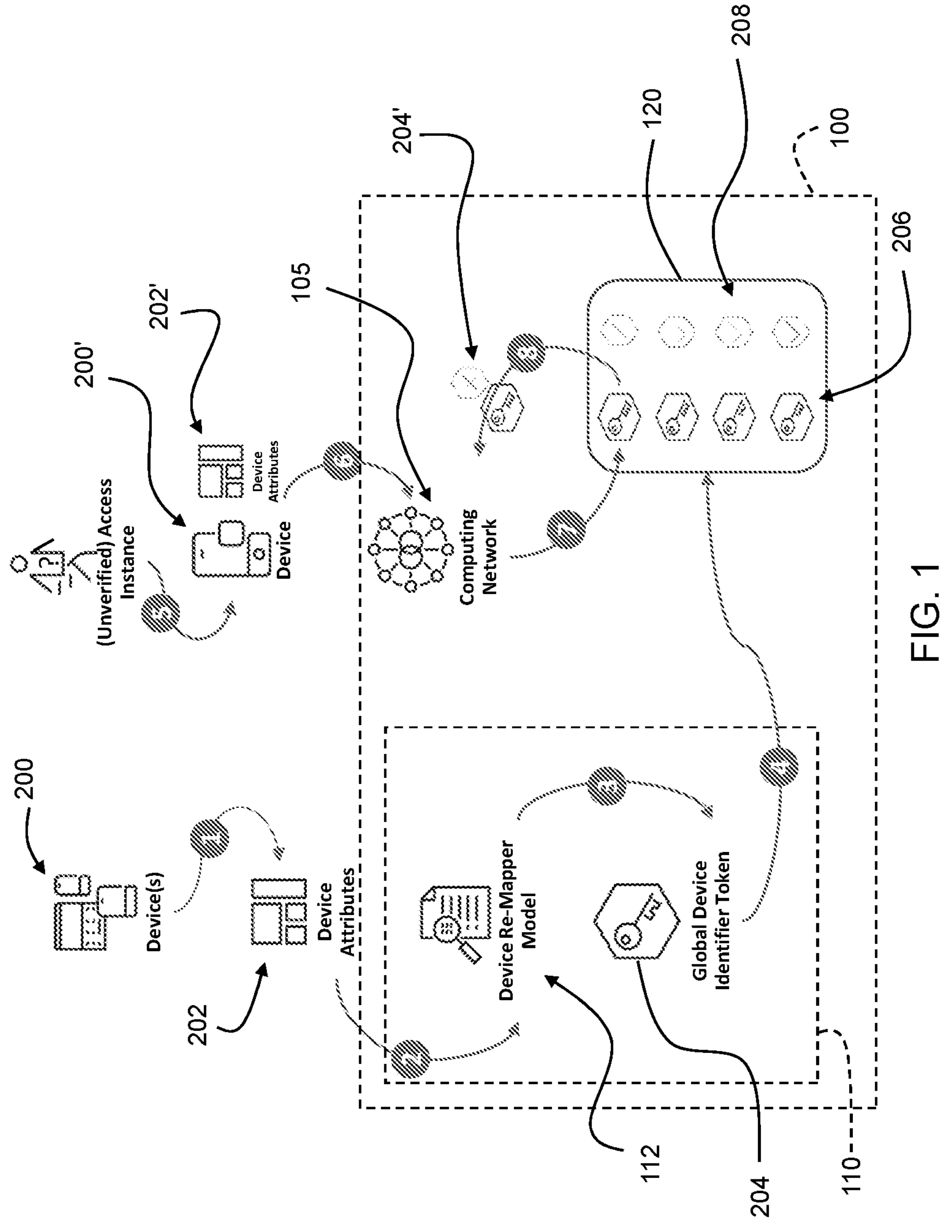
FIGS. 1-9 show example embodiments of the methods and systems described herein.

The present disclosure relates to a device identification and tracking platform that identifies a client computing device that is accessing network resources of a computing network. The platform then tracks further access instances by the client computing device, using identifier mapping algorithms. The further access instances are reviewed to determine whether to decline or approve access to the network resources, or, in some cases, whether additional processes are required to authenticate the client computing device, or determine whether the access instance is legitimate or fraudulent.

As described further herein, client computing devices, such as computing devices operated by users, are frequently used to access network resources of a computing network. Access, as used herein, may refer to any instance of interaction between the client computing device and the computing network, such as log-ins, authentication requests/responses, data retrieval or submission, transactions across the computing network, and the like. In some cases, access instances can be unsuccessful or incomplete, such as unsuccessful or incomplete log-ins or transactions.

In many cases, the client computing device accesses the computing network via a third party, such as a third party that maintains a website or software application (app) enabling access to the computing network. For example, a user may access the network resources of a payment processing computing network using an app that is hosted, maintained, or otherwise associated with a third-party merchant, third-party banking entity, and the like. Third-party, as used herein, refers to a party other than the client computing device (and user thereof) and the computing network. In some cases, however, the computing network enables access to its resources without third-party intervention. Continuing with the above example, a payment processing computing network may host, maintain, or otherwise provide its own dedicated website or app, including digital wallet apps, such as a MASTERCARD, VISA, AMERICAN EXPRESS, etc. app, website, or digital wallet. These websites and apps enabling access to the network resources are collectively referred to as access points.

During a typical access instance, the access point—which includes the third-party access point and/or network-dedicated access point, as described above—collects data about the client computing device that is accessing the network resources. For example, when a client computing device interacts with or accesses a website of a third party (e.g., a merchant website, to make a purchase from the merchant), certain device data associated with the client computing device is exchanged with the third-party website, and thus, captured by a third-party computing device (e.g., a merchant computing device). This collected data is referred to as device data and is associated with the client computing device. The device data may include a variety of data elements or data parameters, many of which are unique to the computing device.

As noted above, the access instance may not always result in completed or successful access to the network resources, but can include attempted log-ins, abandoned transactions, unsuccessful authentication requests, and the like. Therefore, an access instance according to the present disclosure does not need to be successful or complete for the device data and/or access data (as described below) to be collected.

The device identification and tracking platform includes one or more central server devices, referred to herein as access mapping computing devices, that are configured to execute one or more mapping algorithms using the collected device data. The mapping algorithms use device data to generate unique device identifiers (DID) for client computing devices during an initial access instance. During later access instances, the mapping algorithms use device data to map devices to existing (verified) device identifiers.

For example, the mapping algorithms take the device data as inputs and generate a device identifier uniquely associated with the client computing device performing the access instance. In the example embodiment, the device identifier is an identification token, generated as a hash of at least some data elements of the device data collected during that access instance. The access mapping computing device securely stores the device identifier in an identification (ID) database, such as within a relational database structure, as a verified device identifier. The verified device identifier may be stored as part of a device record, which includes at least some elements of the device data from each access instance associated with the same verified device identifier, or a hashed/tokenized version of those data elements.

The access mapping computing device further stores an access profile of the client computing device, associated with the verified device identifier, in the device record. The access profile includes access data for each access instance performed by the client computing device, such as the access type (e.g., transaction, authentication, log-in, data retrieval, etc.), the time and/or duration of access, the access point, success/failure of the access, an indication of whether the access instance is verified/approved or fraudulent/denied, and the like, for each access instance.

During subsequent access instances (after an initial access instance), the access mapping computing device receives the collected device data and access data. The access mapping computing device executes the mapping algorithm(s) to identify the client computing device performing the access instance. More specifically, the access mapping computing device assigns a candidate device identifier to the client computing device and attempts to map the candidate device identifier with a (verified) device identifier stored in the ID database. Notably, the mapping algorithms described herein are designed to accommodate for some threshold level of change in the collected device data and relative to a device record and, therefore, accommodate some difference between a candidate device identifier and a verified device identifier. In this way, the access mapping computing device can identify and track the client computing device across access instances involving a change in fewer than all device data elements, such as a change in IP address or a change in account ID.

The access mapping computing device identifies the client computing device and, based on the verified device identifier, retrieves the access profile for the client computing device. The access mapping computing device executes one or more authentication algorithms to analyze the access profile and, in some embodiments, compare the current access instance with the access profile. When the analysis of the access profile indicates that there is no previous access instance identified as fraudulent, the access mapping computing device may approve the access instance, or approve the access to computing resources of the computing network. When the analysis of the access profile indicates that there is one or more previous access instances identified as fraudulent, the access mapping computing device may deny the access instance, or deny access to the computing resources by the client computing device.

In some cases, the access computing device may not immediately approve or deny the current access instance based on the access profile analysis, but may initiate (or recommend) one or more additional authentication processes. For example, in some cases, the access mapping computing device also compares access data of the current access instance to the access profile and outputs a confidence score associated with a confidence level that the current access instance is legitimate (e.g., based on some level of matching or correspondence with the access profile associated with the verified device identifier). When the confidence score is within a predetermined range, the access mapping computing device initiates (or recommends) an additional authentication procedure that requests further information from the client computing device and/or the user thereof. For example, in the case of an access instance including a transaction request initiated by the user, a step-up authentication challenge may be issued to the user via the client computing device.

In the context of the present disclosure, device data may include any of the following: a unique device identifier associated with the client computing device, such as a MAC address, an IP address associated with the client computing device, and IP prefix associated with the client computing device, an operating system, operating system version, location, time of day, mouse location, time zone, device language, web browser name, web browser version, account ID, or other suitable device attribute information regarding the user device. In some cases, the unique device identifier is generated using a predefined set of the device data. In some cases, where an access instance involves a purchase transaction, device data and/or access data may include some details related to the purchase transaction, or such data may be received by the access mapping computing device (e.g., from a merchant computing device). This transaction data may include an event type associated with a transaction, a client name associated with a transaction, a transaction amount associated with a transaction, a transaction currency code associated with a transaction, a transaction date associated with a transaction, a transaction time associated with a transaction, a HTTP header associated with a transaction, an email address associated with a transaction, a shipping address associated with a transaction, a shipping city associated with a transaction, a shipping state associated with a transaction, a shipping country associated with a transaction, a shipping postal code associated with a transaction, a billing address associated with a transaction, a billing city associated with a transaction, a billing state associated with a transaction, a billing country associated with a transaction, a billing postal code associated with a transaction, a user account identifier associated with a transaction, a telephone number associated with a transaction, a telephone country associated with a transaction, a telephone area code associated with a transaction, a primary account number (PAN) associated with a transaction, a PAN expiration date associated with a transaction, a login authentication method associated with a transaction, a card verification status associated with a transaction, a notification outcome associated with a transaction, a merchant identifier associated with a transaction, an acquirer identifier, a stock keeping unit (SKU) category associated with a transaction, an application message type associated with a transaction, a wallet distributor associated with a transaction, and/or a wallet issuer associated with a transaction.

The technical problems addressed by the fraud detection computing platform include at least one of: (i) inability to identify client computing devices across access instances, (ii) inability to identify client computing devices where parameters of access have changed. (iii) inability to specifically identify client computing devices used to initiate fraudulent payment transactions; (iv) inability of being able to identify client computing devices attempting to resell goods that have been illegally or fraudulently obtained; (v) inability to electronically alert parties about client computing devices used in fraudulently obtaining goods; (vi) inability to electronically receive a message or a request for information from a merchant reseller and electronically respond in real-time with a risk score indicating whether a device attempting to resell a good on such a website is likely associated with a fraudster; and (vii) inability to provide a notification related to resale activity associated with a fraudulent computing device.

The methods and systems described herein may be implemented using computer programming or engineering techniques including computer software, firmware, hardware, or any combination or subset thereof, wherein the technical effects may be achieved by: (a) building an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network; (b) receiving, during a current access instance, device data associated with a candidate client computing device accessing or attempting access to the computing resources of the computing network; (c) tokenizing the device data to generate a candidate device identifier for the candidate client computing device; (d) querying the identification database with the candidate device identifier; and/or (e) in response to a successful query of the identification database, returning the verified device identifier retrieved from the identification database that corresponds to the candidate device identifier.

The resulting technical benefits achieved by the fraud detection computing platform include at least one of: (i) identifying client computing device across access instances, even where certain parameters of access have changed; (ii) identifying, based upon device data, client computing devices used in fraudulent transactions, such as client computing devices used to initiate fraudulent or unauthorized purchases by way of a merchant website; (iii) assigning a flag or a risk score to such client computing devices; (iv) providing an indication, such as the flag, risk score, and/or alert, that such client computing devices are associated with fraudulent or unauthorized purchasing activity to one or more merchant computing devices, such that the one or more merchant computing devices are able to deny subsequent transactions, such as transactions associated with the resale of goods, initiated from such devices; and (v) keeping a running total of previous risk scores for transactions carried out by respective client computing devices.

The following detailed description illustrates embodiments of the disclosure by way of example and not by way of limitation. It is contemplated that the disclosure has general application in industrial, commercial, and academic applications.

FIG. 1 is a schematic diagram illustrating components of a device identification and tracking (DIT) platform 100 for identifying client computing devices used to access network resources and tracking device behavior across access instances. DIT platform 100 may also be referred to herein as a DIT computer system 100. DIT platform 100 includes an access mapping computing device 110 and an identification (ID) database 120. In some cases, DIT platform 100 is associated with, communicatively coupled to, and/or includes a computing network 105, which provides various services via its computing resources. As described further herein, in the example embodiment, computing network 105 is a payment processing computing network, providing various payment and transaction services via its networked computing resources.

DIT platform 100 monitors access to computing network 105 and, in the example embodiment, can control such access to computing network by approving or denying access instances performed by client computing devices 200. A client computing device 200 (operated by a user, not shown in FIG. 1) initiates an access instance (1), in which client computing device 200 accesses or requests access to the computing resources of computing network 105. As described herein, this access instance (1) can include a payment transaction, an account log-in, a digital wallet log-in or access, and the like.

The access instance (1) is enabled by an access point, which can include, as described herein, a third-party website or app, such as a merchant website. As client computing device 200 interacts with the access point, the access point collects device data 202 associated with client computing device 200.

Access mapping computing device 110 receives (2) device data 202. In many embodiments, access mapping computing device 110 receives (2) device data 202 via an Application Programming Interface (API) connection with the access point. Access mapping computing device 110 also collects, receives, or generates access data associated with the particular access instance (1), such as the type of the access instance (1), the time and/or duration of the access instance (1), the particular access point, and the like.

Access mapping computing device 110 executes one or more mapping algorithms 112 with device data 202 as inputs thereto. In some embodiments, access mapping computing device 110 includes a dedicated processor or partitioned processing resources associated with mapping algorithms 112. In some cases, access mapping computing device 110 is described as implementing or executing a mapping engine 114 (see FIG. 2), to execute mapping algorithms 112. Mapping algorithms 112 use device data 202 to generate (3) a unique candidate device identifier 204 for the client computing device 200 performing the access instance (1). In some embodiment, candidate device identifier 204 is a tokenized representation of device data 202, and may be generated (3) as a hash of one or more data elements of device data 202. Access mapping computing device 110 stores (4) candidate device identifier 204 in ID database 120 as a verified device identifier 206, as part of a device record 208 including verified device identifier 206 and device data 202 (or a tokenization/hash thereof). Access mapping computing device 110 also stores (4) the access data (or some aggregation or tokenization thereof) in ID database 120 in device record 208 associated with (e.g., retrievable using) verified device identifier 206.

In a later or further access instance (5), a client computing device 200' attempts to access (6) computing resources of computing network 105 via an access point (not shown in FIG. 1). Client computing device 200' is considered unverified or unauthenticated. The access point collects device data 202' associated with client computing device 200'. Again, access mapping computing device 110 receives device data 202' (e.g., via an API connection with the access point) and generates a candidate device identifier 204' for client computing device 200' using device data 202' (e.g., using mapping algorithms 112 to hash device data 202'). Access mapping computing device 110 executes mapping algorithms 112 to map candidate device identifier 204' to a verified device identifier 206 stored in ID database 120. If unsuccessful at matching candidate device identifier 204' to a verified device identifier 206, access mapping computing device 110 executes mapping algorithms to map device data 202' (or a hash of one or more data elements thereof) to an existing device record 208. As described herein, mapping algorithms 112 accommodate for certain changes between device data 202 (e.g., from an initial access instance (1)) and device data 202' (e.g., from a further access instance (5)), such as changes in IP address, account information, device location, and the like. As such, mapping algorithms 112 return a matched device record 208 or verified device identifier 206 along with a level of confidence associated with the mapping. The level of confidence, also referred to as a confidence score, indicates the likelihood that candidate device identifier 204' is associated with a same client computing device as verified device identifier 206.

If access mapping computing device 110 is unable to map candidate device identifier 204' to any verified device identifier 206, access mapping computing device 110 may interpret access instance (5) as an initial access instance, and store candidate device identifier 204' as a new verified device identifier 206 in ID database. If access mapping computing device 110 does map candidate device identifier 204' to a (previously stored) verified device identifier 206, access mapping computing device 110 retrieves an access profile associated with verified device identifier 206. Access mapping computing device 110 uses the access profile to determine whether to permit or deny access (6) to computing network 105. For example, if the access profile indicates that the client computing device 200' has previously been used in one or more unauthorized or fraudulent access instances, access mapping computing device 110 may deny (8) client computing device 200' access (6) to computing network 105.

In one example embodiment, an access instance (5) includes client computing device 200' attempting a purchase transaction with a merchant. In this example, a website or app of the merchant is the access point, and the merchant (or computing device(s) thereof) collect device data 202' associated with client computing device 200' while the user thereof interacts with the merchant. The user initiates the purchase transaction, thereby requesting access (6) to the computing resources of a payment processing computing network 105. For example, payment processing computing network 105 may include the Mastercard interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, New York). As the merchant computing device processes the purchase transaction, in cooperation with payment processing computing network 105, the merchant computing device may provide device data 202' as well as payment information and/or any other transaction data to access mapping computing device 110. This data exchange may represent an information request or authentication request, from the merchant computing device to access mapping computing device 110, requesting authentication of client computing device 200' or requesting a verified device identifier (206) associated therewith.

The purchase transaction may initially be presented as an access instance without any indication of fraudulent of unauthorized activity. However, in some case, a user may initiate the purchase transaction on their client computing device 200' using lost or stolen payment account details. To detect or identify such unauthorized activity, access mapping computing device 110 may initially receive an indication, such as from a rightful owner of the payment card or payment account, that the transaction was not authorized or initiated by the owner of the payment account. In other words, access mapping computing device 110 may receive an indication from the owner of the payment account (e.g., in response to the appearance of the transaction record on an account statement provided to the owner) that the purchase transaction was made fraudulently and/or without the knowledge and/or permission of the account owner.

In response to such an indication by an owner of a payment account, access mapping computing device 110 may process device data 202' and flag or otherwise designate device data 202' as associated with a fraudulent transaction and/or as associated with a client computing device 200' that may be in the possession of a user who is using the device 200' to initiate fraudulent transactions. More particularly, where device data 202' is capable of being used to uniquely identify client computing device 200' used by the user responsible for the fraudulent transaction, access mapping computing device 110 may flag or otherwise designate client computing device 200' as associated with, or potentially associated with, fraudulent activity. For example, in some embodiments, access mapping computing device 110 updates the device record 208 associated with client computing device 200' with a flag or other "fraud indicator," and/or adds access data (associated with the fraudulent purchase transaction) to the access profile in device record 208, indicating the purchase transaction was fraudulent. In this way, future retrievals and analyses of the corresponding device record 208 will indicate past unauthorized activity.

Figure 2:
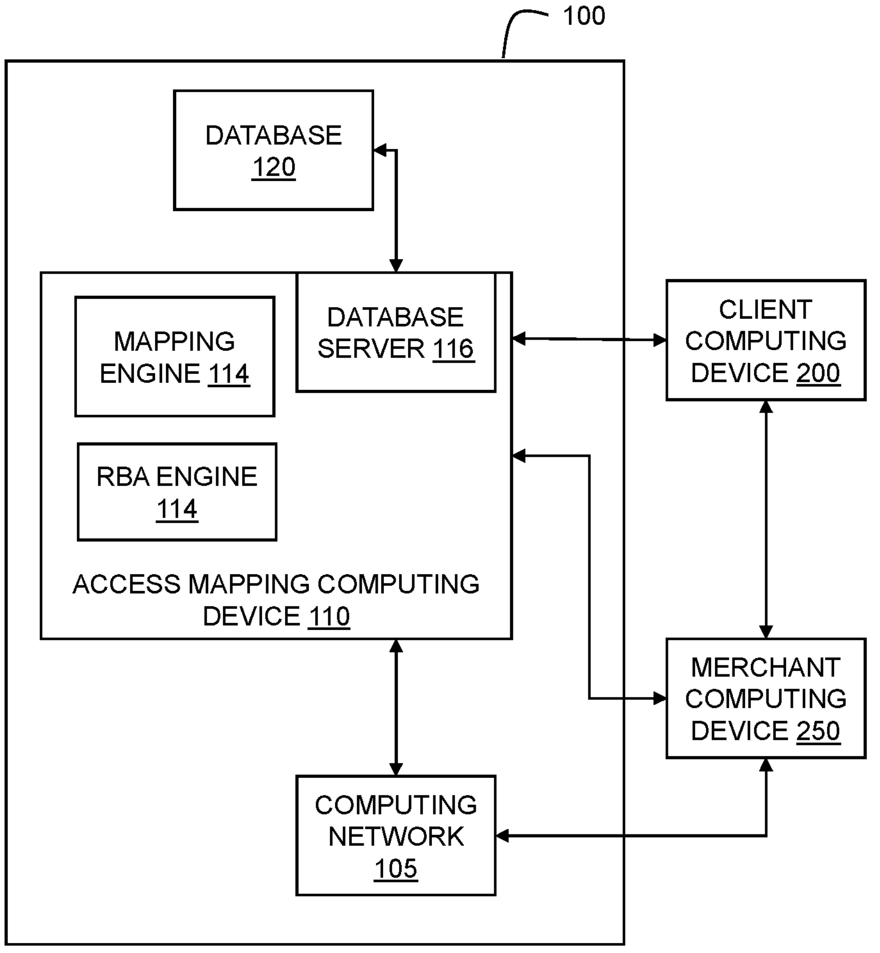

FIG. 2 is a block diagram of an example device identification and tracking (DIT) platform 100 communicatively coupled to a client computing device 200 and an access point (computing device) 250. Computing devices of DIT platform 100, client computing device 200, and access point 250 are communicatively coupled to each other via a plurality of network connections 115. These network connections may be Internet, LAN/WAN (Local Area Network/Wide Area Network), or other connections capable of transmitting data across computing devices. DIT platform 100 includes access mapping computing device 110, a database server 116, and database 120. In one embodiment, access mapping computing device 110 and database server 116 are components of a server system, which may be a server, a network of multiple computer devices, a virtual computing device, or the like. Access mapping computing device 110 may be operated by and/or affiliated with computing network 105 (e.g., a payment processing computing network). Alternatively, access mapping computing device 110 may be operated by and/or affiliated with any entity that enables access mapping computing device 110 to function as described herein, and access mapping computing device 110 may be communicatively coupled to computer network 105 in an unaffiliated relationship.

Certain access instances, in the present disclosure, related to client computing devices 200 interacting with access point devices 250, such as merchant websites or apps. When a user performs a payment transaction at a merchant location and/or via a merchant website, device data, access data, transaction data, and/or authentication data may be generated and/or collected. Such data may be transmitted across computer devices in various data messages. In one embodiment, when a user performs a transaction at an access point 250 associated with a merchant, data for the transaction is transmitted to access mapping computing device 110. Access mapping computing device 110 may also be configured to communicate with client computing device 200 via a separate electronic communication channel or method.

Database server 116 is connected to database 120, which contains information such as device records, merchant criteria/thresholds, device scores, transaction scores, device identifiers, device data, access data, access profiles, and the like. Database 120 may include a single database having separated sections or partitions or may include multiple databases, each being separate from each other.

In the example embodiment, access mapping computing device 110 includes specifically designed computer hardware to perform the steps described herein, and includes specifically designed computer implementation instructions.

Access mapping computing device 110 is a specially designed and customized computer device built to perform the specific functions of identifying devices, such as client computing device 200, accessing computer network 105, and controlling access to computer network 105, as described herein. Access mapping computing device 110 includes mapping engine 114 and RBA engine 118, which may be specifically designed computer hardware, separate processing devices, or partitioned processing resources dedicated to performing the functions of mapping engine 114 and RBA engine 118 described herein.

In some embodiments of the present disclosure, access mapping computing device 110 may transmit device records or portions thereof to requesting devices, such as access points 250 including merchant computing devices. For example, access mapping computing device 110 may transmit access profiles, flags, and/or accumulated device scores associated with a client computing device 200 to requesting device. In some cases, access mapping computing device 110 may transmit the requested data in a message or an alert indicating that the client computing device 200 has been or may be associated with fraudulent purchasing activity, to one or more merchant computing devices, such as merchant computing devices associated with merchant resellers of goods, such as EBAY, CRAIGSLIST, and/or any other merchant resellers of goods. In some embodiments, such as where a risk factor is assigned to the client computing device 200, access mapping computing device 110 may transmit the risk factor to one or more merchant computing devices. The flag, risk factor, or alert may, in various embodiments, be provided to one or more merchant computing devices in response to a request by the merchant computing devices for the flag, risk factor, or alert. Similarly, in some embodiments, the flag, risk factor, or alert may simply be pushed or provided by access mapping computing device 110 to the merchant computing devices absent any request by the merchant computing devices, such as, for example, on a periodic (e.g., real-time, hourly, daily, weekly, etc.) basis.

The merchant computing devices may receive the indication, message, or alert indicating that the client computing device 200 has been or may be associated with fraudulent purchasing activity and/or, where applicable, the risk factor, and, based upon the indication and/or risk factor, the merchant computing devices may determine whether to process a resale transaction received from or initiated by the client computing device. As described in greater detail below, such a resale transaction may include an attempt or request to resell goods obtained during a previous purchase transaction (and/or during any other transaction) via the merchant reseller's website.

For example, a particular merchant computing device may receive a request from the client computing device 200 to post or advertise goods for sale via a website associated with the merchant computing device. For simplicity, such a request may be referred to herein as a "resale transaction." In response to the resale transaction, the merchant computing device may, as described above, utilize device data associated with the client computing device 200 to uniquely identify the client computing device 200. Having identified the client computing device 200, the merchant computing device may communicate with database 120 (via access mapping computing device 110) to retrieve any flag, risk factor, or alert stored in database 120 for the client computing device 200. If a flag, risk factor, or alert is stored in association with the client computing device 200, the merchant computing device may refuse or deny the resale transaction and/or, in some embodiments, the merchant computing device may analyze or evaluate the risk factor, which may include a risk score, associated with the client computing device 200 to determine whether to refuse or deny the resale transaction.

For example, if the risk score stored in association with the client computing device 200 is greater than a threshold value, the merchant computing device may refuse or deny the resale transaction, such that the user is not allowed to offer or advertise the goods for sale. On the other hand, if the risk score stored in association with the client computing device 200 is less than a threshold value, the merchant computing device may process the resale transaction, such that the user is allowed to offer or advertise goods for sale in association with the resale transaction.

Thus, the merchant computing device may determine that a particular client computing device 200 is, or may be, associated with fraudulent or unauthorized purchasing activity. In response to such a determination, the merchant computing device may prevent the user from advertising goods for sale via the merchant reseller's website, including, in some cases, the goods purchased in connection with the first payment transaction (e.g., where the merchant computing device receives an indication that the client computing device is associated with potentially fraudulent activity prior to an attempt at resale of the goods). In other embodiments, the merchant computing device may restrict or prevent login to an account, such as an account provided by the merchant reseller. Further still, in some embodiments, the merchant computing device may prevent account registration and/or provide the device data associated with the client computing device to law enforcement and/or any other system or party for further investigation.

Figure 3:
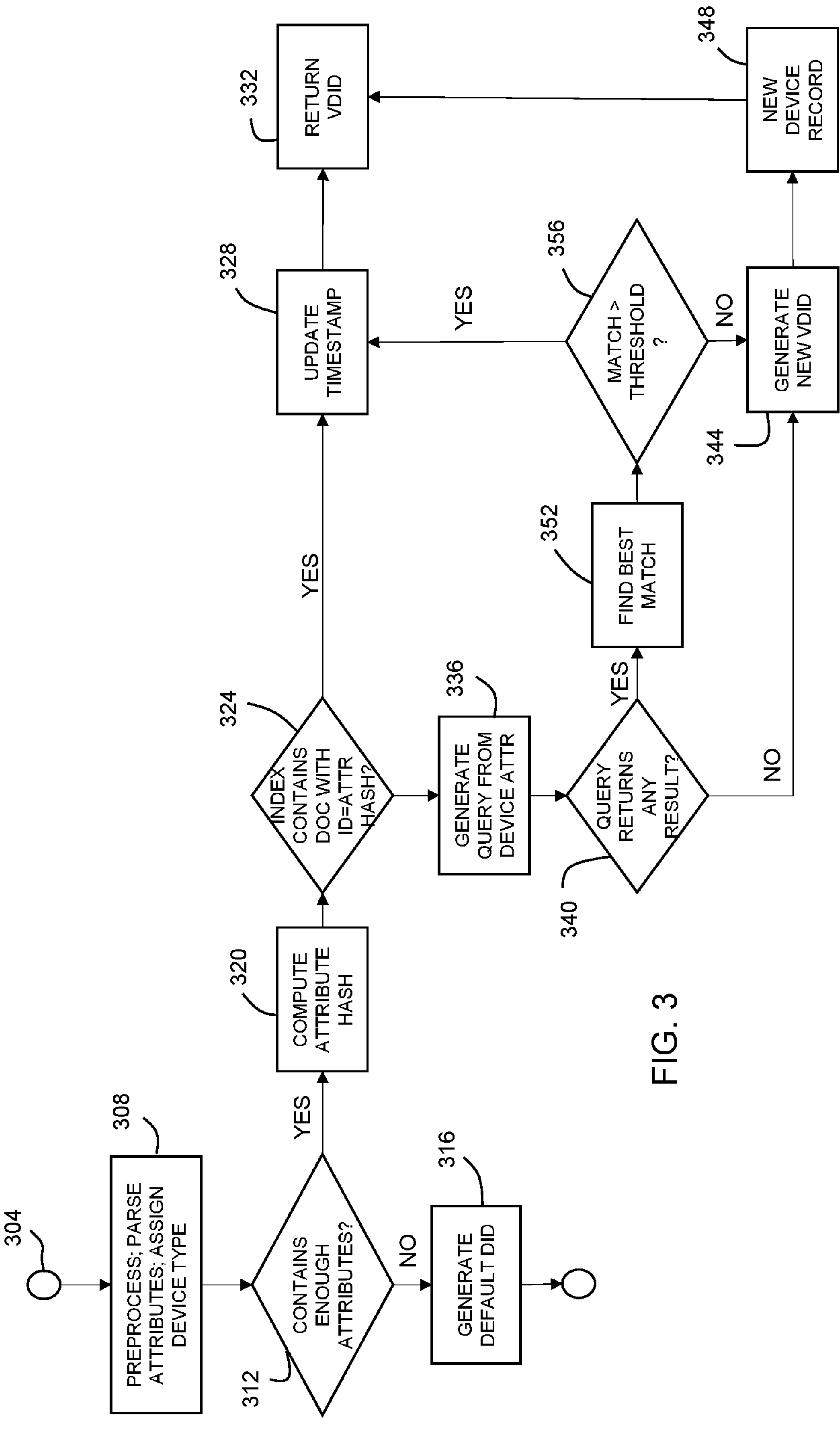

Turning to FIG. 3, a flow diagram of an example device identification process 300 carried out by DIT platform 100 (shown in FIGS. 1 and 2) is illustrated. In some embodiments, device identification process 300 is implemented in whole or in part using access mapping computing device 110 (also shown in FIGS. 1 and 2). For example, access mapping computing device 110 implements or executes mapping engine 114 (shown in FIG. 2) to perform process 300.

Process 300 includes receiving (304) an identification request for a client computing device 200 (also shown in FIGS. 1 and 2). The identification request is received, for example, from an access point (e.g., access point 250, shown in FIG. 2) and is associated with an access instance performed by client computing device 200. The identification request includes device data (e.g., device data 202, shown in FIG. 1) associated with client computing device 200.

Process 300 also includes normalizing (308) the device data. For example, mapping engine 114 preprocesses the device data, parses the device data, and identifies a device type (e.g., device using a first operating system, a device using a second operating system etc.) of client computing device 200.

Process 300 includes determining (312) whether the device data includes a threshold number of elements or attributes. For example, the threshold number of attributes may be a fixed number of attributes (e.g., two attributes, three attributes, etc.). In some instances, mapping engine 114 calculates an entropy of the attributes included in the device data, and calculates a threshold number of attributes based on the entropy.

When mapping engine 114 determines that the device data does not include the threshold number of device attributes ("NO" at decision block 312), mapping engine 114 generates and assigns (316) a default candidate device identifier (DID) for the client computing device 200. Access mapping computing device 110 may not store the default candidate DID or the device data in database 120.

In contrast, when mapping engine 114 determines that the device data includes the threshold number of device attributes ("YES" at decision block 312), mapping engine 114 computes an attribute hash (320) for the device data. The attribute hash is a unique identifier, or signature, for the device data. Mapping engine 114 determines (324) whether database 120 includes a device record (e.g., device record 208, shown in FIG. 1) with a signature equal to the attribute hash. When mapping engine 114 determines that database 120 includes a device record having the same signature as the attribute hash as the device data ("YES" at decision block 324), mapping engine 114 updates (328) a timestamp associated with the existing device record. Mapping engine 114 returns (332) the verified device identifier (e.g., verified device identifier 206, shown in FIG. 1) from the device record as the device identifier to be assigned to the client computing device 200.

When mapping engine 114 determines that database 120 does not include device record with a verified device identifier having the same attribute hash as the device data ("NO" at decision block 324), mapping engine 114 generates a query (336) based on the device data. Mapping engine 114 may run the query based on the assigned device type. For example, mapping engine 114 may search a first index associated with a first device type or search a second index associated with a second device type. The query may include filtering the device data. A filter may include a set of required device attributes that must match the corresponding device attributes of the device data. For example, the filter may indicate that an operating system version attribute, a screen resolution attribute, and a color depth attribute included in the first set of attributes must match the corresponding device attributes associated with an existing device record in database 120, in order for the existing device record to be returned as a query result.

Mapping engine 114 determines (340) whether the query returns any results. When the query does not return any results ("NO" at decision block 340), mapping engine 114 generates (344) a new device record with a new device identifier. After generating a new device record, mapping engine 114 adds (348) the new device record to the database 120 and returns (332) the new device identifier as the verified device identifier to be assigned to the client computing device 200.

Figure 4:
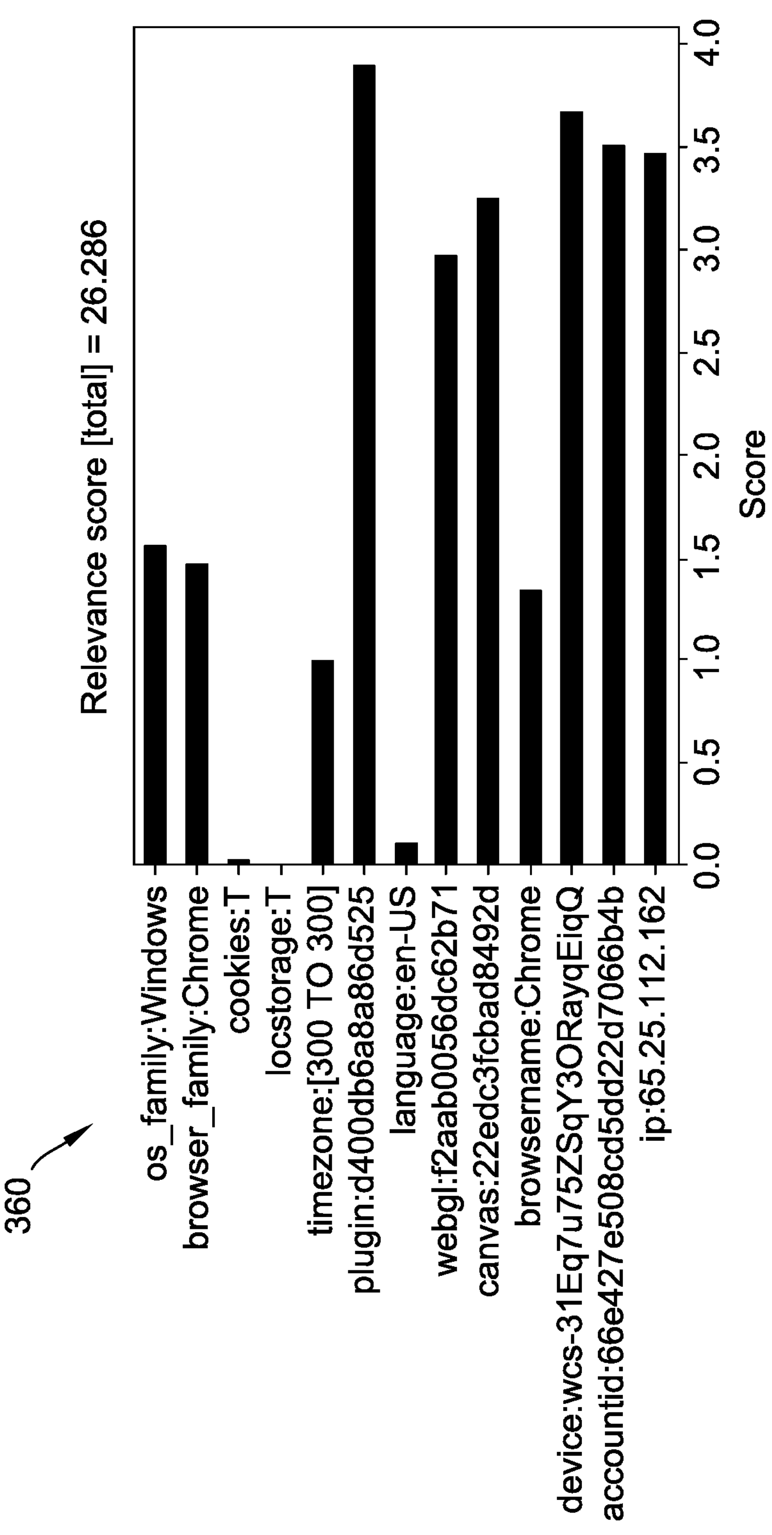
Figure 5:
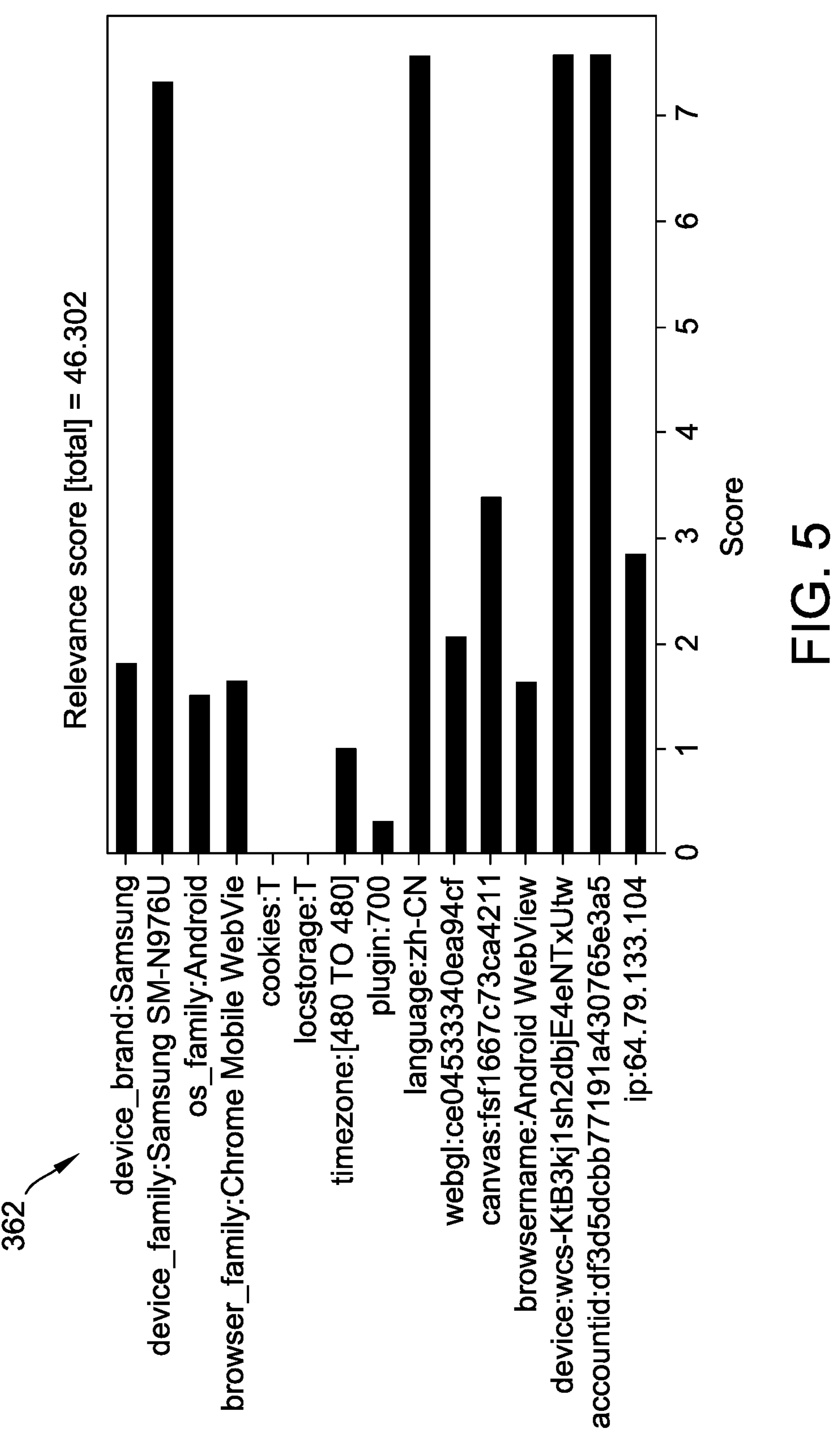

In contrast, when the query returns at least one device record candidate for the device data ("YES" at decision block 340), mapping engine 114 selects (352) a best match device record from the device record candidates included in the search results. For example, mapping engine 114 calculates an overall relevance score for each candidate device record. The overall relevance score may be a weighted score of the device attributes in each device record that match the device attributes included in the received device data. Weights, or individual relevance scores, for device attributes may be based on the uniqueness of the specific attribute. For example, an IP address attribute may have a higher individual relevance score than a device language attribute. FIGS. 4 and 5 illustrate respective first and second example relevance scores 360 and 362 for device attributes.

Referring again to FIG. 3, process 300 includes mapping engine 114 calculating (356) a match score for the selected best match device record and determining whether the match score exceeds a match threshold. The match score may be based on the overall relevance sore, or another matching scheme.

When mapping engine 114 determines that the device attributes associated with the selected best match device record do not exceed the match threshold ("NO" at decision block 356), mapping engine 114 generates (344) a new device record with a new device identifier. After generating the new device record, mapping engine 114 adds (348) the new device record to the database 120, and returns (332) the new device identifier as the verified device identifier to be assigned to the client computing device 200.

In contrast, when mapping engine 114 determines that the device attributes associated with the selected best match device record do exceed the match threshold ("YES" at decision block 356), mapping engine 114 updates a timestamp associated with the selected best match device record, and updates (328) any device attributes in the best match device record that do not match the corresponding device attributes in the device data. Updating (328) may include overwriting one or more existing data elements in the device record, or appending one or more data elements to the data record (e.g., as new rows in a table). Mapping engine 114 returns (332) the verified device identifier associated with the selected best match device record as the verified device identifier to be assigned to the client computing device 200.

Figure 6:
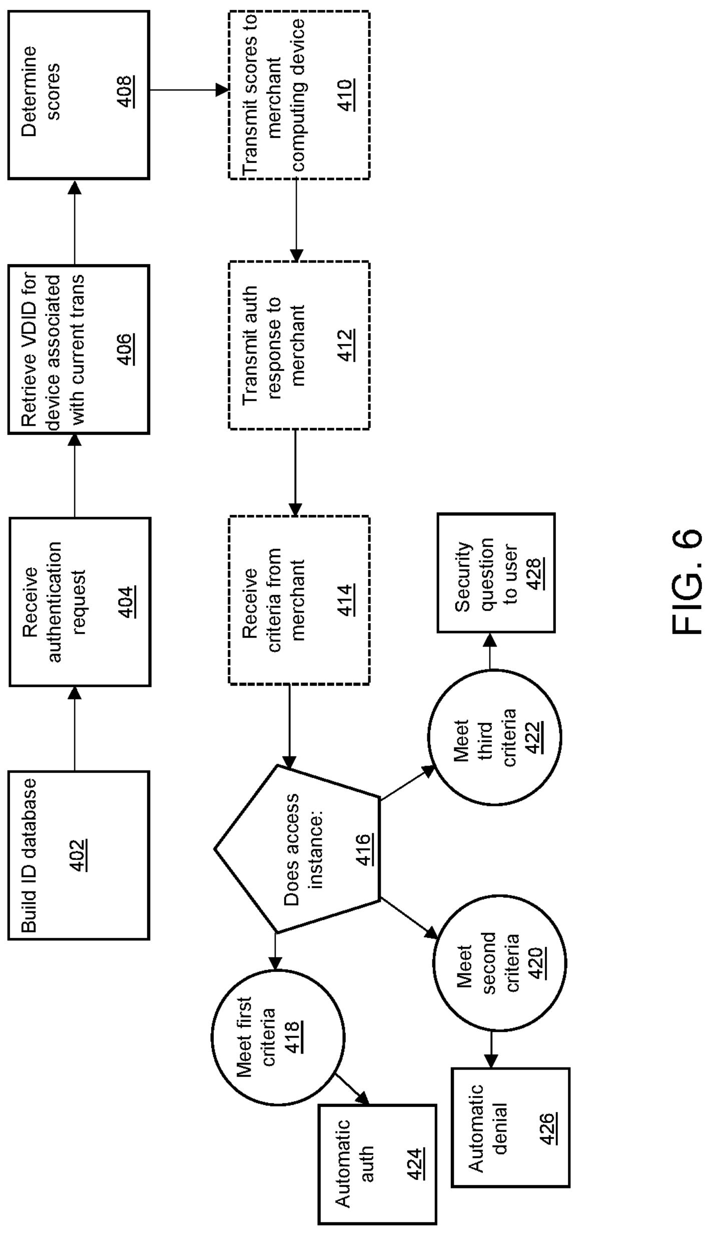

FIG. 6 is a flow diagram illustrating an example access control process 400 carried out by the device identification and tracking platform 100 shown in FIGS. 1 and 2. Specifically, process 400 may be implemented by access mapping computing device 110. Process 400 is shown and described with respect to access control for a computing network including a payment processing computing network, in the context of a purchase transaction.

In step 402, access mapping computing device 110 builds an identification database, such as ID database 120, storing devices records 208 as described above.

In step 404, access mapping computing device 110 receives an authentication request from a merchant computing device for a current transaction initiated by a user utilizing a client computing device. The authentication request may include device data and access data, as well as, in some cases, current transaction data and authentication data.

In step 406, access mapping computing device 110 retrieves the verified device identifier (VDID) for the client computing device carrying out the current transaction. For example, access mapping computing device 110 may tokenize device data from the authentication request to generate a candidate device identifier, query the ID database using the candidate device identifier, and retrieve a matching VDID as well as a device record (including an access profile) associated therewith.

In step 408, access mapping computing device 110 determines one or more scores for the current access instance (e.g., the current transaction). In the example embodiment, access mapping computing device 110 may use a 3DS 2 Protocol (e.g., versions 2.0, 2.1, 2.2, and subsequent versions of the 3DS Protocol) for determining a current transaction score. As compared to previous authentication methods (e.g., 3DS 1.0), the 3DS 2 Protocol (and subsequent versions of the 3DS Protocol) allows for approximately ten times the amount of transaction data (e.g., transaction, device, and token data) to be gathered, analyzed, and utilized to prevent fraud. The additional data included in the 3DS Protocol increases data exchange between merchants and issuers, and improves risk-based authentication (RBA) decisioning and risk score generating.

The 3DS 2 Protocol (and subsequent versions of the 3DS Protocol) enables a marketwide level risk analysis of all transactions that reach access mapping computing device 110. Each transaction can be scored and/or flagged based on the global data available using the 3DS 2 Protocol (and subsequent versions of the 3DS Protocol). Additionally, the payment processor associated with access mapping computing device 110 has the ability to see cardholder activity across the digital and physical domains, and can utilize this expanded view to improve scoring.

In some embodiments, as part of step 408, access mapping computing device 110 may assign a risk factor, such as a numerical score or a "risk score" to the device record corresponding to a client computing device, where the risk factor may be indicative of a likelihood or probability that the client computing device has been or is being used to initiate one or more fraudulent or otherwise unauthorized transactions. Access mapping computing device 110 may weight different factors of the device data and/or access data differently to determine the risk factor. For example, the time and date that a transaction takes place may have low weight in determining the risk score, but the input user name and address may have a higher weight in determining the risk score. That is, if the input user name and/or address are suddenly changed when carrying out a transaction, access mapping computing device 110 may generate a high risk score for that transaction, whereas, if the time a transaction is completed changes slightly from typical transaction times, access mapping computing device 110 may still generate a low risk score for the transaction.

In other embodiments, each access instance including a transaction being performed by a user with a merchant may be evaluated. For example, RBA may be performed by access mapping computing device 110 (e.g., using an RBA engine 118, shown in FIG. 2) Access mapping computing device 110 stores, in a local memory or in ID database 120, an authentication profile, which includes rules for performing and routing authentication requests. When access mapping computing device 110 is invoked during an access instance including an authentication request for a transaction, access mapping computing device 110 may receive (e.g., via an API connection with the merchant computing device) device data and access data, as well as transaction data and/or authentication data. Based on the received data, access mapping computing device 110 executes RBA engine 118 to generate a verification result. The verification result includes a score, in some embodiments.

In some embodiments, the verification result generated by RBA engine 118 includes a current transaction score, a risk analysis, and at least one reason code. In some embodiments, the current transaction score is a score representing a determined riskiness of the transaction. In some specific embodiments, lower scores indicates higher risk and higher scores indicates lower risk, but other schema are contemplated within the scope of the present disclosure. In other words, the current transaction score represents a likelihood that the suspect cardholder (e.g., the person attempting to perform a transaction) is the legitimate cardholder having the privileges to use the payment card to perform a payment transaction. For example, the verification result may indicate that a transaction initiated at a regional U.S. company from an IP server located in Russia is most likely fraudulent, and the generated current transaction score may be very low. For further example, the current transaction score may be represented by a number from 0-999 and/or by a risk threshold category from 0-19. Those of skill in the art will appreciate that any suitable risk score may be used.

The risk analysis is a description of a level of risk corresponding to the current transaction score (e.g., low risk, medium risk, or high risk). Further, the reason codes include one or more factors that influenced the current transaction score. In some embodiments, the reason codes are generated using reason code categories. In some embodiments, the reason codes are affected by rules and/or a combination of the rules and a trained model. RBA engine 118 may transmit the verification result to the RBA-enabled directory server.

In some embodiments, the authentication carried out by access mapping computing device 110 also uses an accumulated device score (also referred to herein as a trust score) to determine an access outcome for access instances such as purchase transactions. Access mapping computing device 110 may store the accumulated device score in a device record corresponding to the client computing device. As such, the accumulated device score is retrieved when a matching device record 208 is retrieved during an access instance. Based on an access outcome of the access instance, access mapping computing device 110 may update the stored device score (e.g., by updating one or more fields in the device record 208). For example, if any access instances are denied or otherwise are indicated as potentially unauthorized, the accumulated device score of the corresponding client computing device 200 will reflect the client computing device 200 potentially being high risk and/or compromised.

In some embodiments, in a step 410, access mapping computing device 110 transmits, in response to receiving an API call from the merchant computing device, the current transaction score and the accumulated device score to the merchant computing device. In some embodiments, in a step 412, access mapping computing device 110 transmits an authentication response to the merchant computing device. The authentication response may be determined based upon the current transaction score and/or the accumulated device score.

In some embodiments, in a step 414, access mapping computing device 110 receives thresholds or other verification criteria from the merchant computing device. In some embodiments, access mapping computing device 110 may store the thresholds or other criteria received from the merchant computing device, and may retrieve these thresholds from a database or memory location where they were previously stored, during a current access instance. The thresholds or criteria indicate circumstances (e.g., a score or risk level meeting certain criteria) in which a merchant instructs access mapping computing device 110 to automatically approve a transaction, automatically deny a transaction, or conduct further authentication procedures. For example, the thresholds may include a threshold in which the merchant stops the processing of a payment transaction and a threshold in which the merchant automatically processes the payment transaction. If access mapping computing device 110 has these thresholds stored for the merchant, access mapping computing device 110 can automatically deny authentication the client computing device 200 used to carry out the current transaction (e.g., if the current transaction score and/or accumulated device score are below the merchant threshold for automatic authentication denial), automatically authenticate the client computing device 200 used to carry out the current transaction (e.g., if the current transaction score and/or accumulated device score are above the merchant threshold for automatic authentication), or transmit a security of authentication prompt to authenticate the user of the client computing device 200 used to carry out the current transaction (e.g., if the current transaction score and accumulated device score are between the merchant thresholds for automatic denial/authentication).

More particularly, during any current access instance, access mapping computing device 110 may leverage a verification result, current transaction score, and/or the accumulated device score in determining the access outcome. In step 416, access mapping computing device 110 determines whether the access instance (e.g., the current transaction related to the authentication request) meets first criteria (step 418), second criteria (step 420), or third criteria (step 422). For example, if any score or other verification result meets a first criterion (e.g., is above or below a threshold indicating low risk or high trust, depending on the scale of the score; does not include any flags), access mapping computing device 110 may automatically approve access to the payment processing computing network (e.g., approve the purchase transaction) or transmit a recommendation to a merchant computing device and/or issuer computing device to approve the access, at step 242. If any score or other verification result meets a second criterion (e.g., is above or below a threshold indicating high risk or low trust, depending on the scale of the score; includes one or more flags), access mapping computing device 110 may automatically deny access to the payment processing computing network (e.g., decline the purchase transaction) or transmit a recommendation to a merchant computing device and/or issuer computing device to deny the access, at step 426. If any score or other verification result meets a third criterion (e.g., is between high/low trust or risk thresholds), access mapping computing device 110 may execute RBA engine 118 to perform one or more additional authentication procedures. For example, RBA engine 118 may transmit an authentication prompt—such as a security question—to a client computing device, requesting additional information from the client computing device and/or the user thereof.

The current transaction score and the accumulated device score are not always both high or both low. For example, a current transaction score for a transaction carried out by a client computing device at a merchant that the user of the client computing device regularly does business with may be high (e.g., indicating low risk). However, the accumulated device score may indicate that multiple fraudulent transactions have been carried out by the client computing device, so the accumulated device score may be low (e.g., indicating high risk). Access mapping computing device 110 may deny the current access instance if one of the current transaction score and the accumulated device score indicate high risk.

In addition, in the example embodiment, access mapping computing device 110 may update an accumulated device score, or other score or factor, associated with the client computing device 200 based upon a plurality of access instances (e.g., purchase transactions, log-ins, etc.) initiated from the client computing device 200. More particularly, access mapping computing device 110 may update an accumulated device score associated with the client computing device 200 in response to a plurality of indications of fraudulent or unauthorized purchasing activity initiated from the client computing device 200. As another example, access mapping computing device 110 may update an accumulated device score associated with the client computing device 200 in response to an indication that a transaction initiated from the client computing device 200 was authorized or was not fraudulent. Further, in some embodiments, access mapping computing device 110 may update an accumulated device score associated with the client computing device 200 after a predetermined period of time has elapsed, provided no indication of fraud or unauthorized purchasing activity is received in connection with the client computing device 200 during that period of time.

Figure 7:
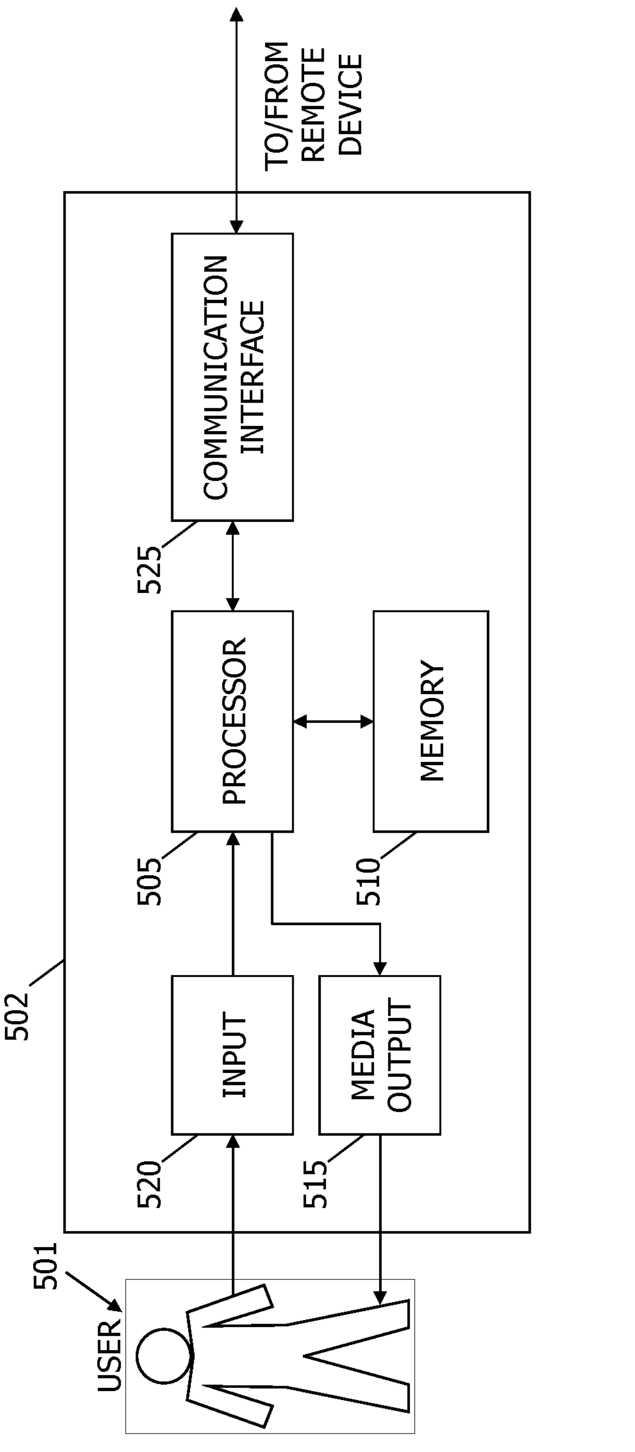

FIG. 7 illustrates an example configuration of a user system 502, such as a client computing device configured to transmit data to access mapping computing device 110. User system 502 may include, but is not limited to, client computing device 200 (shown in FIGS. 1 and 2). In the example embodiment, user system 502 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

User system 502 also includes at least one media output component 515 for presenting information to user 501. Media output component 515 is any component capable of conveying information to user 501. For example, media output component 515 may be a display component. In some embodiments, media output component 515 includes an output adapter such as a video adapter and/or an audio adapter. An output adapter is operatively coupled to processor 505 and operatively connectable to an output device such as a display device, a liquid crystal display (LCD), organic light emitting diode (OLED) display, or “electronic ink” display, or an audio output device, a speaker or headphones.

In some embodiments, user system 502 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. User system 502 may also include a communication interface 525, which is communicatively connectable to a remote device such as an access point device 250, computing network 105, or access mapping computing device 110 (shown in FIGS. 1 and 2). Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from an access point device 250. A client application allows user 501 to interact with a server application from an access point device 250.

Figure 8:
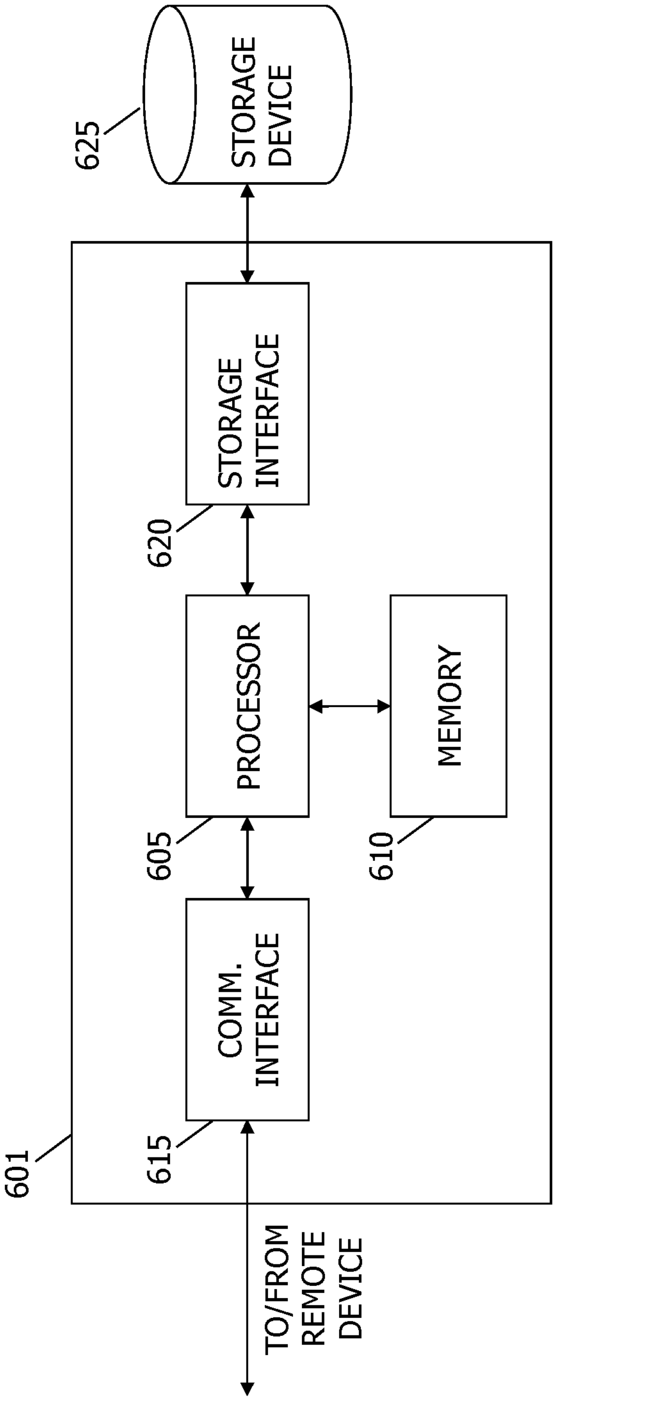

FIG. 8 illustrates an example configuration of a server system 601 such as access mapping computing device 110 shown in FIGS. 1 and 2. Server system 601 may additionally or alternatively include, but is not limited to, database server 116, access point device 250, and computer network 105 (all shown in FIG. 2).

Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on the server system 601, such as UNIX, LINUX, Microsoft Windows®, etc. More specifically, the instructions may cause various data manipulations on data stored in storage device 625 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 605 is operatively coupled to a communication interface 615 such that server system 601 is capable of communicating with a remote device such as a user system or another server system 601. For example, communication interface 615 may receive communications from client computing devices 200 and/or access point devices 250 via the Internet, as illustrated in FIG. 2.

Processor 605 may also be operatively coupled to a storage device 625. Storage device 625 is any computer-operated hardware suitable for storing and/or retrieving data. In some embodiments, storage device 625 is integrated in server system 625. In other embodiments, storage device 625 is external to server system 601 and is similar to database 120 (shown in FIG. 2). For example, server system 601 may include one or more hard disk drives as storage device 625. In other embodiments, storage device 625 is external to server system 601 and may be accessed by a plurality of server systems 601. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some embodiments, processor 605 is operatively coupled to storage device 625 via a storage interface 620. Storage interface 620 is any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 625.

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 9:
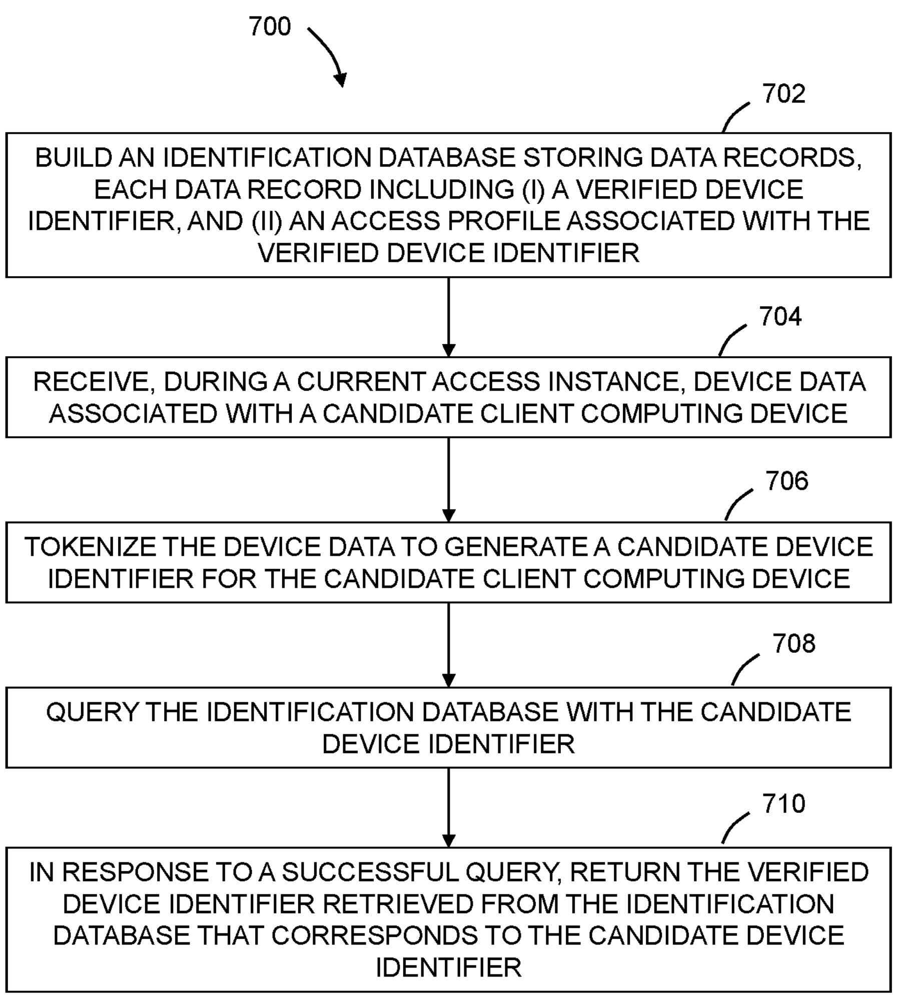

FIG. 9 is an example flow diagram illustrating a method 700 by which access mapping computing device 110 (shown in FIGS. 1 and 2) identifies a client computing device performing an access instance in which the client computing device access or requests access to computing resources of a computing network, as described herein.

Method 700 includes building 702 an identification database. The identification database stores a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network.

Method 700 also includes receiving 704, during a current access instance, device data associated with a candidate client computing device accessing or attempting access to the computing resources of the computing network, and tokenizing 706 the device data to generate a candidate device identifier for the candidate client computing device.

Method 700 further includes querying 708 the identification database with the candidate device identifier, and, in response to a successful query of the identification database, returning 710 the verified device identifier retrieved from the identification database that corresponds to the candidate device identifier.

Method 700 may include additional, fewer, or alternative steps.

In some embodiments, method 700 also includes, in response to an unsuccessful query of the identification database, generating a new data record for the candidate client computing device, the new data record including the candidate device identifier as the verified device identifier of the candidate client computing device.

In some embodiments, method 700 also includes, in response to the successful query of the identification database: (a) retrieving the access profile associated with the verified device identifier; (b) comparing access data associated with the current access instance to the access profile, and (c) based on the comparison, approving or denying the access to the computing resources of the computing network by the candidate computing device. In some such embodiments, method 700 further includes: (d) returning a verification result as an outcome of the comparison, (e) when the verification result satisfies a first criterion, approving the access to the computing resources of the computing network by the candidate computing device, (f) when the verification result satisfies a second criterion different from the first criterion, denying the access to the computing resources of the computing network by the candidate computing device, and (g) when the verification result satisfies a third criterion different from the first and second criteria, initiating an additional authentication process, the initiating comprising transmitting an authentication prompt to the candidate computing device. In some such embodiments, method 700 also includes updating the retrieved access profile with an outcome of the access instance, including the access data associated with the current access instance as well as one of the access approval, the access denial, or a result of the additional authentication process.

In some embodiments, method 700 includes, in response to an unsuccessful query of the identification database using the candidate device identifier, generating a second query associated with one or more data elements of the received device data. Method 700 may further include querying the identification database with the second query to return one or more matching device records that share at least one data element of the one or more data elements of the received device data, identifying, from the one or more matching device records, a best match device record, and returning the verified device identifier from the best match device record as the verified device identifier associated with the candidate client computing device.

In some embodiments, the current access instance is a purchase transaction initiated by the candidate client computing device with a merchant, and the computing network is a payment processing computing network. Method 700 may further include, based on the access profile associated with the verified device identifier: (a) approving the purchase transaction, (b) denying the purchase transaction, or (c) initiating an additional authentication process, including transmitting an authentication prompt to the candidate client computing device.

As will be appreciated based on the foregoing specification, the above-described embodiments of the disclosure may be implemented using computer programming or engineering techniques including computer software, firmware, hardware or any combination or subset thereof, wherein the technical effect is to identify a device used in a fraudulent transaction, such as to fraudulently acquire goods, as well as to prevent future or consecutive fraudulent or unauthorized purchasing activity from the device. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An access mapping computing device for identifying a client computing device and determining whether to provide access to computing resources of a computing network, the computing network having a plurality of access points thereto, the access mapping computing device comprising at least one processor in communication with at least one memory device, the at least one processor programmed to:

build an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network;

receive, from an access point during a current access instance, device data associated with a candidate client computing device accessing or attempting access to the computing resources of the computing network via the access point;

tokenize the device data to generate a candidate device identifier for the candidate client computing device;

query the identification database with the candidate device identifier;

in response to a successful query of the identification database, return the verified device identifier retrieved from the identification database that corresponds to the candidate device identifier;

in response to an unsuccessful query of the identification database using the candidate device identifier:

generate a second query associated with one or more data elements of the received device data;

query the identification database with the second query to return one or more matching device records that share at least one data element of the one or more data elements of the received device data;

identify, from the one or more matching device records, a best match device record; and return the verified device identifier from the best match device record as the verified device identifier associated with the candidate client computing device;

retrieve the access profile associated with the returned verified device identifier;

detect, in the access profile, a flag indicating the candidate client computing device is associated with at least one previous unauthorized access instance; and in response to detecting the flag, restrict access to the computing resources of the computing network by the candidate client computing device, by (i) denying the access by candidate client computing device, or (ii) transmitting, to the access point, the flag to cause the access point to restrict or deny the access.

2. The access mapping computing device of claim 1, wherein the at least one processor is further programmed to:

in response to an unsuccessful second query of the identification database, generate a new data record for the candidate client computing device, the new data record including the candidate device identifier as the verified device identifier of the candidate client computing device.

3. The access mapping computing device of claim 1, wherein the at least one processor is further programmed to, in response to the successful query of the identification database:

compare access data associated with the current access instance to the access profile; and based on the comparison, approve or restrict the access to the computing resources of the computing network by the candidate client computing device.

4. The access mapping computing device of claim 3, wherein the at least one processor is further programmed to:

return a verification result as an outcome of the comparison;

when the verification result satisfies a first criterion, approve the access to the computing resources of the computing network by the candidate client computing device;

when the verification result satisfies a second criterion different from the first criterion, deny the access to the computing resources of the computing network by the candidate client computing device; and when the verification result satisfies a third criterion different from the first and second criteria, initiate an additional authentication process, the initiating including transmitting an authentication prompt to the candidate client computing device.

5. The access mapping computing device of claim 4, wherein the at least one processor is further programmed to update the retrieved access profile with an outcome of the access instance, including the access data associated with the current access instance as well as one of the access approval, the access denial, or a result of the additional authentication process.

6. The access mapping computing device of claim 1, wherein the current access instance is a purchase transaction initiated by the candidate client computing device with a merchant, and wherein the computing network is a payment processing computing network, the at least one processor further programmed to, based on the access profile associated with the verified device identifier:

approve the purchase transaction;

deny the purchase transaction; or initiate an additional authentication process, including transmitting an authentication prompt to the candidate client computing device.

7. A computer-implemented method for identifying a client computing device and determining whether to provide access to computing resources of a computing network, the computing network having a plurality of access points thereto, the method implemented by an access mapping computing device including at least one processor in communication with at least one memory device, the method comprising:

building an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access the computing resources of the computing network;

receiving, from an access point during a current access instance, device data associated with a candidate client computing device accessing or attempting access to the computing resources of the computing network via the access point;

tokenizing the device data to generate a candidate device identifier for the candidate client computing device;

querying the identification database with the candidate device identifier;

in response to a successful query of the identification database, returning the verified device identifier retrieved from the identification database that corresponds to the candidate device identifier;

in response to an unsuccessful query of the identification database using the candidate device identifier:

generating a second query associated with one or more data elements of the received device data;

querying the identification database with the second query to return one or more matching device records that share at least one data element of the one or more data elements of the received device data;

identifying, from the one or more matching device records, a best match device record; and returning the verified device identifier from the best match device record as the verified device identifier associated with the candidate client computing device;

retrieving the access profile associated with the returned verified device identifier;

detecting, in the access profile, a flag indicating the candidate client computing device is associated with at least one previous unauthorized access instance; and in response to detecting the flag, restricting access to the computing resources of the computing network by the candidate client computing device, by (i) denying the access by candidate client computing device, or (ii) transmitting, to the access point, the flag to cause the access point to restrict or deny the access.

8. The computer-implemented method of claim 7, further comprising:

in response to an unsuccessful second query of the identification database, generating a new data record for the candidate client computing device, the new data record including the candidate device identifier as the verified device identifier of the candidate client computing device.

9. The computer-implemented method of claim 7, further comprising, in response to the successful query of the identification database:

comparing access data associated with the current access instance to the access profile; and based on the comparison, approving or restricting the access to the computing resources of the computing network by the candidate client computing device.

10. The computer-implemented method of claim 9, further comprising:

returning a verification result as an outcome of the comparison;

when the verification result satisfies a first criterion, approving the access to the computing resources of the computing network by the candidate client computing device;

when the verification result satisfies a second criterion different from the first criterion, denying the access to the computing resources of the computing network by the candidate client computing device; and when the verification result satisfies a third criterion different from the first and second criteria, initiating an additional authentication process, the initiating comprising transmitting an authentication prompt to the candidate client computing device.

11. The computer-implemented method of claim 10, further comprising updating the retrieved access profile with an outcome of the access instance, including the access data associated with the current access instance as well as one of the access approval, the access denial, or a result of the additional authentication process.

12. The computer-implemented method of claim 7, wherein the current access instance is a purchase transaction initiated by the candidate client computing device with a merchant, and wherein the computing network is a payment processing computing network, the method further comprising, based on the access profile associated with the verified device identifier:

approving the purchase transaction;

denying the purchase transaction; or initiating an additional authentication process, comprising transmitting an authentication prompt to the candidate client computing device.

13. At least one non-transitory computer-readable storage medium having computer-executable instructions stored thereon, wherein, when executed by at least one processor of an access mapping computing device, the computer-executable instructions cause the at least one processor to:

build an identification database storing a plurality of data records, each data record including (i) a verified device identifier identifying a corresponding client computing device, the verified device identifier including tokenized device data of the corresponding client computing device, and (ii) an access profile associated with the verified device identifier and associated with at least one previous access instance in which the corresponding client computing device accessed or attempted to access computing resources of the computing network;

receive, from an access point to the computing network and during a current access instance, device data associated with a candidate client computing device accessing or attempting access to the computing resources of the computing network via the access point;

tokenize the device data to generate a candidate device identifier for the candidate client computing device;

query the identification database with the candidate device identifier;

in response to a successful query of the identification database, return the verified device identifier retrieved from the identification database that corresponds to the candidate device identifier;

in response to an unsuccessful query of the identification database using the candidate device identifier:

generate a second query associated with one or more data elements of the received device data;

query the identification database with the second query to return one or more matching device records that share at least one data element of the one or more data elements of the received device data;

identify, from the one or more matching device records, a best match device record; and return the verified device identifier from the best match device record as the verified device identifier associated with the candidate client computing device;

retrieve the access profile associated with the returned verified device identifier;

detect, in the access profile, a flag indicating the candidate client computing device is associated with at least one previous unauthorized access instance;

in response to detecting the flag, restrict access to the computing resources of the computing network by the candidate client computing device, by (i) denying the access by candidate client computing device, or (ii) transmitting, to the access point, the flag to cause the access point to restrict or deny the access.

14. The at least one non-transitory computer-readable storage medium of claim 13, wherein the computer-executable instructions further cause the at least one processor to:

in response to an unsuccessful second query of the identification database, generate a new data record for the candidate client computing device, the new data record including the candidate device identifier as the verified device identifier of the candidate client computing device.

15. The at least one non-transitory computer-readable storage medium of claim 13, wherein the computer-executable instructions further cause the at least one processor to, in response to the successful query of the identification database:

compare access data associated with the current access instance to the access profile; and based on the comparison, approve or deny the access to the computing resources of the computing network by the candidate client computing device.

16. The at least one non-transitory computer-readable storage medium of claim 15, wherein the computer-executable instructions further cause the at least one processor to:

return a verification result as an outcome of the comparison;

when the verification result satisfies a first criterion, approve the access to the computing resources of the computing network by the candidate client computing device;

when the verification result satisfies a second criterion different from the first criterion, deny the access to the computing resources of the computing network by the candidate client computing device; and when the verification result satisfies a third criterion different from the first and second criteria, initiate an additional authentication process, the initiating including transmitting an authentication prompt to the candidate client computing device.

17. The at least one non-transitory computer-readable storage medium of claim 13, wherein the current access instance is a purchase transaction initiated by the candidate client computing device with a merchant, and wherein the computing network is a payment processing computing network, wherein the computer-executable instructions further cause the at least one processor to, based on the access profile associated with the verified device identifier:

approve the purchase transaction;

deny the purchase transaction; or initiate an additional authentication process, including transmitting an authentication prompt to the candidate client computing device.

* * * * *